US010970881B2

(12) United States Patent
Thirumalai

(10) Patent No.: US 10,970,881 B2
(45) Date of Patent: Apr. 6, 2021

(54) FALLBACK MODES FOR DISPLAY COMPRESSION

(71) Applicant: Samsung Display Co., Ltd., Yongin-si (KR)

(72) Inventor: Vijayaraghavan Thirumalai, Fremont, CA (US)

(73) Assignee: Samsung Display Co., Ltd., Yongin-si (KR)

( * ) Notice: Subject to any disclaimer, the term of this patent is extended or adjusted under 35 U.S.C. 154(b) by 103 days.

(21) Appl. No.: 16/262,848

(22) Filed: Jan. 30, 2019

(65) Prior Publication Data

US 2020/0202574 A1  Jun. 25, 2020

Related U.S. Application Data

(60) Provisional application No. 62/784,351, filed on Dec. 21, 2018.

(51) Int. Cl.
*G06T 9/00* (2006.01)

(52) U.S. Cl.
CPC ...................... *G06T 9/00* (2013.01)

(58) Field of Classification Search
CPC ........................................ G06T 9/00
USPC .......................................... 375/243
See application file for complete search history.

(56) References Cited

U.S. PATENT DOCUMENTS 8,849,049 B2  9/2014  Kato et al.
8,934,542 B2  1/2015  Wiegand et al.
9,247,242 B2  1/2016  Rapaka et al.
9,813,733 B2  11/2017  Gao et al.
2013/0294524 A1  11/2013  Van Der Auwera et al.
2014/0307771 A1  10/2014  Hemmendorff et al.
2016/0301950 A1  10/2016  Jacobson et al.
2017/0105011 A1  4/2017  Chen et al.
2017/0230687 A1*  8/2017  Chen ..................... H04N 19/105
2017/0310987 A1  10/2017  Wu et al.
2017/0318299 A1  11/2017  Merkle et al.

FOREIGN PATENT DOCUMENTS

GB  2265783 A  10/1993

OTHER PUBLICATIONS

VESA Display Compression-M (VDC-M) Standard, Video Electronics Standards Association, www.vesa.org, Version 1.1, May 11, 2018, 173 pages in view of Chen et al (US 2017/0230687). (Year: 2017).*
Extended European Search Report for corresponding European Patent Application No. 19218932.2, dated May 12, 2020, 11 pages.
(Continued)

*Primary Examiner* — Kevin M Burd
(74) *Attorney, Agent, or Firm* — Lewis Roca Rothgerber Christie LLP

(57) ABSTRACT

Provided is a display stream codec for a display device including an encoder, wherein the encoder is configured to determine a fallback display mode as a display mode for a current block to be encoded, represent a mode signaling of the fallback display mode that is identical to a mode signaling of a regular display mode corresponding to the fallback display mode, encode the current block in accordance with the fallback display mode using a same signaling syntax as the corresponding regular display mode, and send the encoded current block.

19 Claims, 7 Drawing Sheets

(56) References Cited

OTHER PUBLICATIONS

VESA Display Compression-M (VDC-M) Standard, Video Electronics Standards Association, www.vesa,org, Version 1.1, May 11, 2018, 173 pages.
VESA Display Stream Compression (DSC) Standard, Video Electronics Standards Association, www.vesa.org, Version 1.1, Aug. 1, 2014, 125 pages.

* cited by examiner

FALLBACK MODES FOR DISPLAY COMPRESSION

CROSS-REFERENCE TO RELATED APPLICATION(S)

This patent application claims priority to, and the benefit of, U.S. provisional patent application No. 62/784,351 entitled FALLBACK MODES FOR DISPLAY COMPRESSION, filed on Dec. 21, 2018.

FIELD

One or more aspects of embodiments of the present disclosure relate generally to improved methods of display compression including improved methods of display compression encoding.

BACKGROUND

Due to continued increase in pixel bandwidth associated with display technology, especially for mobile displays and virtual reality (VR) displays, VESA (Video Electronics Standard Association) has issued a Call for Technologies (CfT) for a display stream codec that supports higher compression rates while allowing for increased computational complexity with respect to display stream compression (DSC).

VESA has developed a new display interface compression standard for mobile/smartphone displays, called VESA Display Codec for Mobile (VDC-M). As a new display compression standard, VDC-M targets higher compression ratios than Display Stream Compression (DSC), while still maintaining visually lossless quality, at the cost of increased complexity. VDC-M is fixed rate display stream codec, and therefore has a fixed bitrate, and may support compression rates down to 6 bits/pixel for a RGB 4:4:4 source. VDC-M is a block-based codec with a block size of 8×2 pixels.

It should be noted that information disclosed in this Background section is only for enhancement of understanding of the embodiments of the present disclosure and may include technical information acquired in the process of achieving the inventive concept. Therefore, it may contain information that does not form prior art.

SUMMARY

Embodiments described herein provide improvements to display stream compression and display technology.

According to one embodiment of the present disclosure, there is provided a display stream codec for a display device including an encoder, wherein the encoder is configured to determine a fallback display mode as a display mode for a current block to be encoded, represent a mode signaling of the fallback display mode that is identical to a mode signaling of a regular display mode corresponding to the fallback display mode, encode the current block in accordance with the fallback display mode using a same signaling syntax as the corresponding regular display mode, and send the encoded current block.

The regular display mode may be a transform display mode, wherein the encoder is further configured to select an intra predictor for the current block, send a predictor index corresponding to the intra predictor, generate a predicted block based on the selected intra predictor, calculate a residue between the current block and the predicted block, apply a transform on the residue to generate transform coefficients, quantize the transform coefficients to generate quantized transform coefficients, entropy encode the quantized transform coefficients to generate encoded quantized transform coefficients, and send the encoded quantized transform coefficients.

The fallback display mode may be a transform-based fallback display mode, wherein the encoder is further configured to select an intra predictor for the current block, send a predictor index corresponding to the intra predictor, set a residue corresponding to the current block as zero, set quantized transform coefficients same as residue, and entropy encode the quantized transform coefficients.

The display stream codec may further include a decoder in communication with the encoder, wherein the decoder is configured to receive an encoded block of data including mode signaling bits, receive mode-specific information, receive a quantized residue, and process the received mode signaling bits, the received mode-specific information, and the received quantized residue to decode the encoded block of data.

The decoder may be further configured to receive the predictor index from the encoder, decode the intra predictor, calculate intra predictor values, generate a predicted block based on the intra predictor values, receive the transform coefficients from the encoder, generate a residue block based on the transform coefficients, and generate a reconstructed block by summing the predicted block and the residue block.

The mode-specific information may include at least one of an intra predictor index when the regular display mode includes a transform display mode and the fallback display mode is a transform-based fallback display mode, a block prediction vector when the regular display mode includes a block prediction display mode and the fallback display mode includes a BP-skip mode, and a step size and a color space when the regular display mode includes a midpoint prediction display mode and the fallback display mode includes a midpoint prediction fallback display mode.

The decoder may be further configured to operate in the same manner for both the regular display mode and the fallback display mode.

The signaling syntax may include at least one bit for indicating the regular display mode, mode-specific information, and a plurality of bits representing a quantized residue corresponding to the current block, wherein the quantized residue for the fallback display mode is set to zero.

According to another embodiment of the present disclosure, there is provided a method for encoding display data, the method including determining, by an encoder, a fallback display mode as a display mode for a current block to be encoded, representing, by the encoder, a mode signaling of the fallback display mode that is identical to a mode signaling of a regular display mode corresponding to the fallback display mode, encoding, by the encoder, the current block in accordance with the fallback display mode using a same signaling syntax as the corresponding regular display mode, and sending, by the encoder, the encoded current block.

The regular display mode may be a transform display mode, the method further including selecting, by the encoder, an intra predictor for the current block, sending, by the encoder, a predictor index corresponding to the intra predictor, generating, by the encoder, a predicted block based on the selected intra predictor, calculating, by the encoder, a residue between the current block and the predicted block, applying, by the encoder, a transform on the residue to generate transform coefficients, quantizing, by the encoder, the transform coefficients to generate quantized transform coefficients, entropy encoding, by the encoder, the quantized transform coefficients to generate encoded quantized transform coefficients, and sending, by the encoder, the encoded quantized transform coefficients, wherein the residue is calculated as zero when the fallback display mode is selected.

The fallback display mode may be a transform-based fallback display mode, the method further including selecting, by the encoder, an intra predictor for the current block, sending, by the encoder, a predictor index corresponding to the intra predictor, setting, by the encoder, a residue corresponding to the current block as zero, setting, by the encoder, quantized transform coefficients same as residue, and entropy encoding, by the encoder, the quantized transform coefficients.

The method may further include receiving, by a decoder in communication with the encoder, an encoded block of data including mode signaling bits, receiving, by the decoder, mode-specific information, receiving, by the decoder, a quantized residue, and processing, by the decoder, the received mode signaling bits, the received mode-specific information, and the received quantized residue to decode the encoded block of data.

The method may further include receiving, by the decoder, the predictor index from the encoder, decoding, by the decoder, the intra predictor, calculating, by the decoder, intra predictor values, generating, by the decoder, a predicted block based on the intra predictor values, receiving, by the decoder, transform coefficients from the encoder, generating, by the decoder, a residue block based on the transform coefficients, and generating, by the decoder, a reconstructed block by summing the predicted block and the residue block.

The mode-specific information may include at least one of an intra predictor index when the regular display mode includes a transform display mode and the fallback display mode is a transform-based fallback display mode, a block prediction vector when the regular display mode includes a block prediction display mode and the fallback display mode includes a BP-skip mode, and a step size and a color space when the regular display mode includes a midpoint prediction display mode and the fallback display mode includes a midpoint prediction fallback display mode.

The method may further include operating, by the decoder, in the same manner for both the regular display mode and the fallback display mode.

The signaling syntax may include at least one bit for indicating the regular display mode, mode-specific information, and a plurality of bits representing a quantized residue corresponding to the current block, wherein the quantized residue for the fallback display mode is set to zero.

According to yet another embodiment of the present disclosure, there is provided a non-transitory computer readable medium implemented on a display codec for a display device, the non-transitory computer readable medium having computer code that, when executed on a processor, implements a method of display compression, the method including determining, by an encoder, a fallback display mode as a display mode for a current block to be encoded, representing, by the encoder, a mode signaling of the fallback display mode that is identical to a mode signaling of a regular display mode corresponding to the fallback display mode, encoding, by the encoder, the current block in accordance with the fallback display mode using a same signaling syntax as the corresponding regular display mode, and sending, by the encoder, the encoded current block.

The fallback display mode may be a transform-based fallback display mode, wherein the computer code, when executed by the processor, further implements the method of display compression by selecting, by the encoder, an intra predictor for the current block, sending, by the encoder, a predictor index corresponding to the intra predictor, setting, by the encoder, a residue corresponding to the current block as zero, setting, by the encoder, quantized transform coefficients same as residue, and entropy encoding, by the encoder, the quantized transform coefficients.

The fallback display mode may be a transform-based fallback display mode, wherein the computer code, when executed by the processor, further implements the method of display compression by selecting, by the encoder, an intra predictor for the current block, sending, by the encoder, a predictor index corresponding to the intra predictor, setting, by the encoder, a residue corresponding to the current block as zero, setting, by the encoder, quantized transform coefficients same as residue, and entropy encoding, by the encoder, the quantized transform coefficients.

The computer code, when executed by the processor, may further implement the method of display compression by receiving, by a decoder in communication with the encoder, an encoded block of data including mode signaling bits, receiving, by the decoder, mode-specific information, receiving, by the decoder, a quantized residue, and processing, by the decoder, the received mode signaling bits, the received mode-specific information, and the received quantized residue to decode the encoded block of data.

Accordingly, the system of embodiments of the present disclosure is able to improve display stream compression by reducing a number of bits signaled from the encoder to the decoder, and by providing simplified methods for signaling fallback modes.

BRIEF DESCRIPTION OF THE DRAWINGS

These and/or other aspects will become apparent and more readily appreciated from the following description of the embodiments, taken in conjunction with the accompanying drawings, in which.

DETAILED DESCRIPTION

Figure 1:
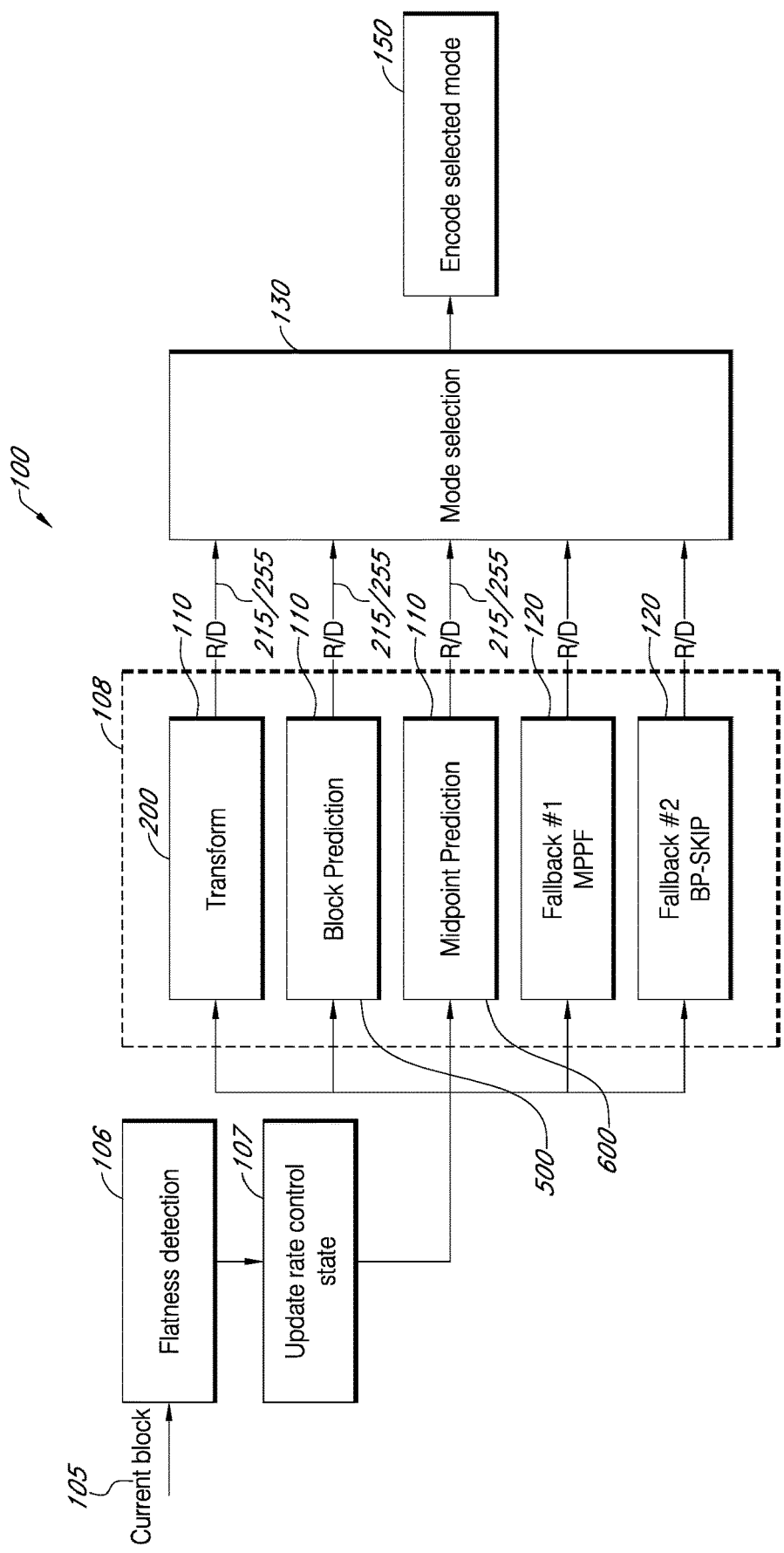
FIG. 1 is a block diagram of an example of an encoder of an advanced display stream compression coder-decoder (VDC-M CODEC)

Features of the inventive concept and methods of accomplishing the same may be understood more readily by reference to the detailed description of embodiments and the accompanying drawings. Hereinafter, embodiments will be described in more detail with reference to the accompanying drawings. The described embodiments, however, may be embodied in various different forms, and should not be construed as being limited to only the illustrated embodiments herein. Rather, these embodiments are provided as examples so that this disclosure will be thorough and complete, and will fully convey the aspects and features of the present inventive concept to those skilled in the art. Accordingly, processes, elements, and techniques that are not necessary to those having ordinary skill in the art for a complete understanding of the aspects and features of the present inventive concept may not be described. Unless otherwise noted, like reference numerals denote like elements throughout the attached drawings and the written description, and thus, descriptions thereof will not be repeated. Further, parts not related to the description of the embodiments might not be shown to make the description clear. In the drawings, the relative sizes of elements, layers, and regions may be exaggerated for clarity.

Various embodiments are described herein with reference to sectional illustrations that are schematic illustrations of embodiments and/or intermediate structures. As such, variations from the shapes of the illustrations as a result, for example, of manufacturing techniques and/or tolerances, are to be expected. Further, specific structural or functional descriptions disclosed herein are merely illustrative for the purpose of describing embodiments according to the concept of the present disclosure. Thus, embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting. Additionally, as those skilled in the art would realize, the described embodiments may be modified in various different ways, all without departing from the spirit or scope of the present disclosure.

FIG. 1 is a block diagram of an example of an encoder of an advanced display stream compression coder-decoder (VDC-M CODEC).

Referring to FIG. 1, the encoder 100, which may be part of a VDC-M, receives a stream of image data comprising individual blocks of pixels, where each block has a dimension of 8×2 pixels. During each block-time, the VDC-M encoder 100 performs the steps depicted in FIG. 1 on a current block 105.

After receiving the current block 105, the VDC-M encoder 100 may perform flatness detection 106 to determine a level of flatness of the block. It should be noted that most of the embodiments described herein skip a process of detecting flatness (e.g., skip or disable the flatness detection 106). However, an embodiment of the present disclosure may determine for each block whether the block corresponds to either a flat area (e.g., smooth area corresponding to a natural image or a computer generated image) or a complex area (e.g., textured area corresponding to a natural image or a computer generated image). When the flatness flag is enabled (e.g., such that flatness detection 106 of FIG. 1 occurs), the encoder 100 may signal a 1-bit flatness flag (e.g., flatness flag may be 1 if the encoder 100 identifies a transition either from flat to complex, or from complex to flat, or if the current block 105 is flat); a flatness type (e.g., if flatness flag is 1, two additional bits are signaled to indicate the flatness type) to the decoder (e.g., after the mode signaling and before signaling the mode associated information and quantized residuals, which will be described further below). In one embodiment, in case of a transform mode, the flatness information may be signaled in addition to the best intra predictor and the quantized residue (described below). The encoder 100 may signal the flatness type regardless of what mode is selected, as the same signaling syntax may be used regardless of what mode is selected (e.g. the transform mode, the BP mode, the MPP mode, the BP skip mode, or MPP fallback mode).

The encoder 100 may then update a rate control state 107 in accordance with the level of flatness of the current block.

Thereafter, the encoder 100 tests a full set of possible coding modes/display modes, which may be referred to generally as "modes" herein, using a mode-testing module 108. The encoder 100 may test these modes in parallel to determine which mode to select to perform display compression.

Because each of the modes is generally tailored to certain types of content, a typical display image will contain a diverse use of the different coding modes corresponding to the different blocks that make up the image. The set of modes may include different types, which will be generally referred to regular modes 110 and fallback modes 120 herein. The set of modes may include: a transform mode to generally capture natural contents; a block prediction (BP) mode to generally capture graphic contents; a midpoint prediction (MPP) mode to generally capture uncorrelated noise contents; and fallback modes 120 to ensure proper behavior of the display stream codec when the regular modes 110 are not affordable or are otherwise unavailable (e.g., an MPP Fallback (MPPF) mode corresponding to the MPP mode, and a BP-Skip mode corresponding to the BP mode).

In testing the different modes, the encoder 100 may calculate a rate and distortion (RD) cost for each mode (e.g., RD=D+λR, where R is the rate of mode, D is the distortion that is computed according to a sum of absolute differences (SAD), and λ is a Lagrangian parameter). The encoder 100 may then select 130 the mode with the smallest RD cost as the "best mode," subject to the constraint that the selected mode does not violate any rate control constraints. The encoder 100 generally ensures that two or more modes are available for purposes of mode selection for every block-time.

Finally, the selected mode is encoded 150 and the encoder 100 proceeds to a subsequent block and repeats the procedure above.

Each decision regarding the mode selected for each block is explicitly signaled by the encoder 100 to a decoder using a plurality of syntax bits. The signaling syntax for signaling the encoder's decision for each block to the decoder may indicate which of the modes 110, 120 is selected, flatness information of the block, and other information that is dependent on the coding mode. Accordingly, the information may be parsed by the decoder, which may ideally perform a minimum number of steps for each mode.

Accordingly, to summarize, in selecting the mode, the VDC-M encoder 100 will test a set of coding modes 110, 120 for each block within a slice comprising a plurality of blocks or pixels. For each of the different modes 110, 120, the encoder 100 may determine a rate corresponding to the total of all syntax bits used by the respective mode, and a distortion to compute an RD cost, and may then generally select 130 the mode that is expected to minimize RD cost. The encoder 100 may then encode 150 the selected mode in the bitstream, and may then repeat the process for the following block.

The number of syntax bits associated with each of the modes 110, 120 may vary. For example, in signaling the chosen best mode for each block to the decoder, the signaling syntax may include a 1-bit "sameFlag," which may be set to 1 when the previously selected mode for the previous block and the current block mode are the same, and may be 0 otherwise. If the 1-bit sameFlag is 0, the newly selected mode for the current block, which is different from the mode of the previous block, may be signaled using 2 to 3 bits.

Although the encoder 100 may generally pick one of the regular modes 110, and may signal the selected regular mode 110 to the decoder, fallback modes 120 conventionally need to be signaled (e.g., using a mode header) to indicate that they are a separate mode for purposes of mode signaling. However, signaling the fallback mode 120 conventionally requires additional data for purposes of mode signaling, and may be a relatively costly solution at higher compression rations, or equivalently at lower bits per pixel (bpp).

That is, and for example, mode signaling the selection of one of the regular modes 110 may only use 2 bits, whereas mode signaling the selection of one of the fallback modes 120 may use an additional third bit. Because the encoder 100 may select from five different modes 110, 120 in the present example, the encoder 100 generally cannot separately signal each of the five different modes without using three bits for at least one of the modes 110, 120. Because the fallback modes 120 are used less frequently than the regular modes 110, the regular modes 110 may generally be signaled using only two bits, while one or more of the fallback modes 120 generally use an additional third bit.

As discussed above, mode signaling the selection of a fallback mode, although occurring less often than signaling the selection of a regular mode, may be bit costly due to use of an additional bit in the signaling syntax.

Accordingly, embodiments of the present disclosure improve display stream compression technology by providing a novel method of signaling the selection of one or more fallback modes without using any additional bits over the signaling of the selection of the regular modes. That is, the fallback modes of the disclosed embodiments may follow the same signaling syntax as regular modes, thereby unifying a decoding process without additional overhead.

Further, embodiments of the present disclosure also provide a novel transform-based fallback mode, which may reconstruct block samples by using a best available intra predictor by setting a residue to zero.

Further still, the implementation of the novel transform-based fallback mode may also be extended to other fallback modes (e.g., BP-skip mode and MPPF mode) to follow the same signaling syntax as their regular mode counterparts (e.g., BP mode and MPP mode).

Figure 2A:
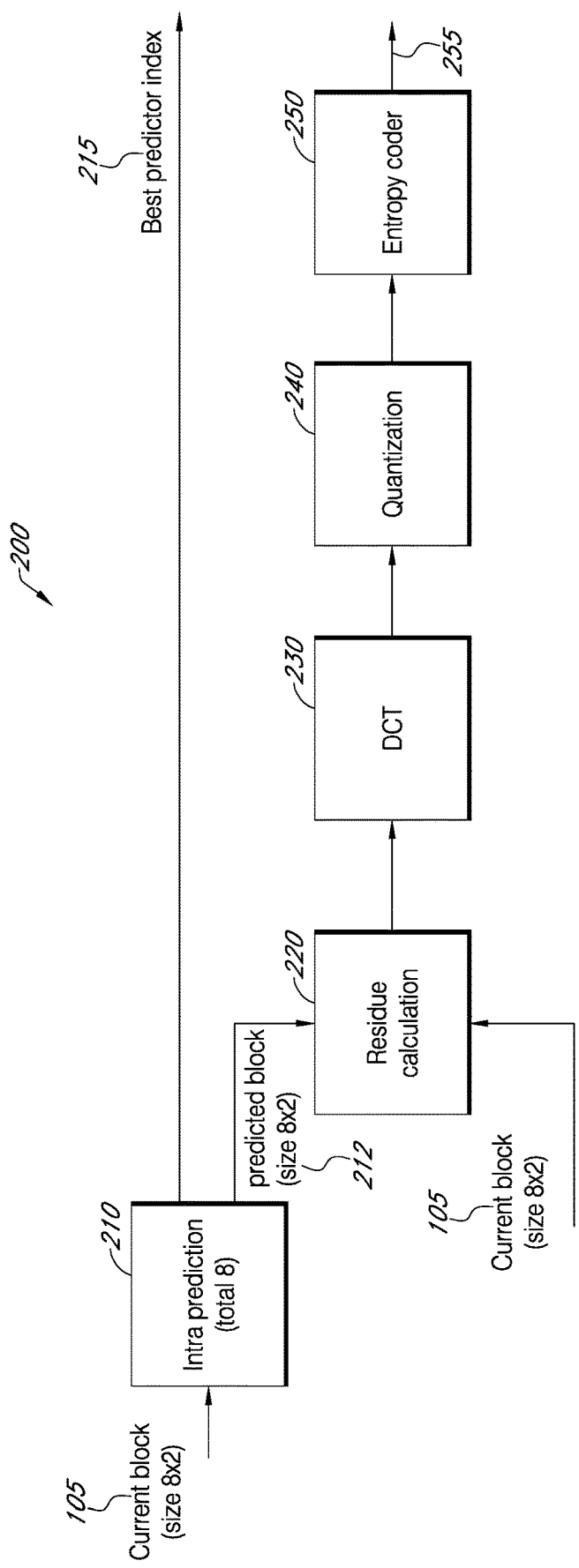
FIG. 2a is a block diagram illustrating a system and method for implementing a transform mode at an encoder, according to an embodiment of the present disclosure.
Figure 2B:
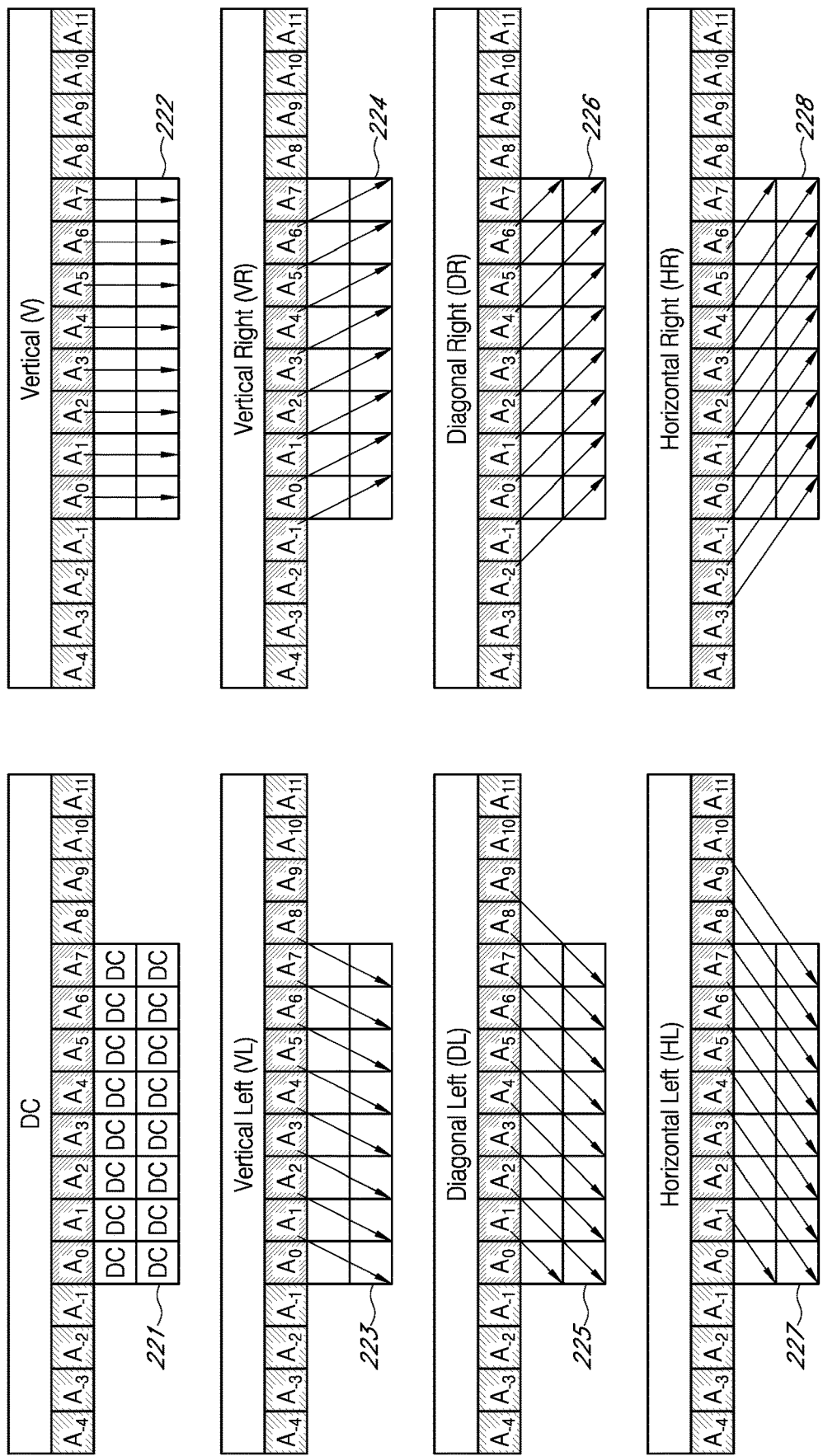
FIG. 2b is an illustration depicting a set of eight possible intra predictors, according to an embodiment of the present disclosure.

FIG. 2a is a block diagram illustrating a system and method for implementing a transform mode at an encoder, according to an embodiment of the present disclosure. FIG. 2b is an illustration depicting a set of eight possible intra predictors, according to an embodiment of the present disclosure.

Referring to FIG. 2a, a transform mode implementation module 200 of the encoder 100 receives a current block 105 of pixels, and then performs intra prediction 210 to select a predicted block 212 (e.g., to select one of eight possible predicted blocks corresponding to the intra predictors/eight possibilities for intra prediction 221-228 shown in FIG. 2b). It should be noted that the transform mode implementation module 200 of the present embodiment may correspond to that shown in the encoder 100 of FIG. 1. The predicted block 212 may be selected by minimizing the error between the given predicted block 212 and the current block 105. A best predictor index (e.g., intra predictor index) 215 may be used to determine the rate and distortion cost, and may be stored in memory, or in a buffer of the encoder 100. The encoder 100 may ultimately signal the best predictor index 215 to the decoder (e.g., decoder 400 of FIG. 4, which will be discussed further below), when the best mode for the current block 105 of pixels is selected as a transform mode.

Referring to FIG. 2b, according to the present embodiment, there are eight possibilities for intra prediction: DC 221, Vertical 222, Vertical left 223, Vertical right 224, Diagonal left 225, Diagonal right 226, Horizontal left 227, and Horizontal left 228. The intra predictors 221-228 used in the present embodiment may be similar to the ones used in H.264 video coder, and may correspond to the eight intra predictors used in VDC-M. However, the intra predictors 221-228 in the present embodiment may be modified in that the samples in blocks immediately to the left are not used to allow low complexity and high-throughput. It should further be noted that, for blocks received by the encoder 100 in a first line in a slice (FLS), there may be no neighbors/neighboring blocks available. Accordingly, a DC predictor 221 may be used, where a selected DC value is equal to half of the dynamic range (e.g., 128 for 8 bpc source).

Referring back to FIG. 2a, after the encoder 100 chooses the "best" of the eight possible intra predictor 221-228 through intra prediction 210, the encoder 100 calculates a best predictor index 215, which may be stored in memory, and may then later be signaled to the decoder 400 (when the best mode for the current block 105 of pixels is selected as a transform mode). The encoder 100 may then perform a residue calculation 220 by comparing the current block 105 with the predicted block 212 corresponding to the selected intra predictor 221-228 chosen based on the performed intra prediction 210. That is, the encoder 100 may use the selected predicted block 212 and the current block 105 to calculate a residue 220 by determining a difference thereof (i.e., a pixel-wise difference between the current block and the predicted block for each color component).

The encoder 100 may then apply a transform (e.g., a discrete cosine transform (DCT)) 230 on the calculated residue between the predicted block 212 and the current block 105 to generate transform coefficients. Thereafter, the encoder 100 may quantize 240 the transform coefficients to generate quantized transform coefficients, and may then entropy code 250 the quantized transform coefficients. Encoded quantized transform coefficients 255 may be used along with the best predictor index 215 to determine the rate and distortion cost, and may be stored in memory, or in the buffer of the encoder 100. The encoder 100 may thereafter retrieve the best predictor index 215 and the coefficients 255, and may then signal the encoded quantized transform coefficients 255 to the decoder 400 when the best mode for the current block 105 of pixels is selected as a transform mode.

As will be described below, the decoder 400 may use the signaled encoded quantized transform coefficients 255 and the best predictor index 215 signaled by the encoder 100, and, based thereon, may decode the current block 105.

With respect to mode signaling, when the encoder 100 selects the transform mode as the selected mode for the current block 105, then the encoder 100 may signal this selection to the decoder 400 in the mode header. The transform mode syntax for signaling to the decoder 400 may indicate the following: whether the selected mode for the current block 105 (e.g., current block mode) is the same as a previous block mode using a 1-bit sameFlag; a mode type (e.g., transform mode) using the mode header (e.g., a 2-bit mode header if the sameFlag indicates that the current and previous block modes are not the same); a selected intra prediction mode (e.g., the selected intra predictor 221-228), which may be signaled using 3-bit signaling for blocks that are not in the first line of slice (NFLS); and quantized transform coefficients, or quantized residuals, which may be entropy coded using N bits (N being an integer) and signaled to the decoder as the encoded quantized transform coefficients 255.

Figure 3:
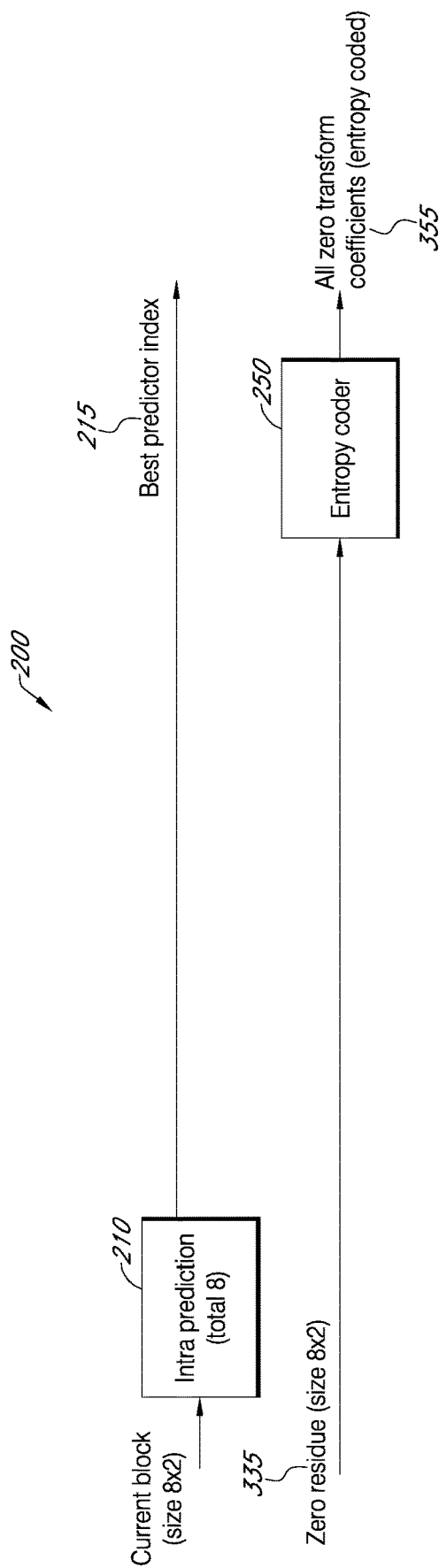
FIG. 3 is a block diagram illustrating a system and method for implementing a transform-based fallback mode at an encoder, according to an embodiment of the present disclosure.

FIG. 3 is a block diagram illustrating a system and method for implementing a transform-based fallback mode at an encoder, according to an embodiment of the present disclosure.

Referring to FIG. 3, the encoder 100 of the present embodiment improves over conventional encoders in that it provides a novel transform-based fallback mode when the transform mode described with respect to FIG. 2a is preferred, yet is not affordable. In selecting the novel transform-based fallback mode, the encoder 100 may still send the best predictor index 215 to the decoder 400, but may instead signal as if the regular transform mode is selected while using only two bits in the mode header.

That is, despite selecting the transform-based fallback mode, the encoder 100 signals to the decoder 400 that the regular transform mode is selected, and the same two bits used to signal the regular transform mode may be used, thereby avoiding the need to use a third bit in the mode header to indicate a change from the transform mode to the transform-based fallback mode.

When the encoder 100 selects the transform-based fallback mode, the transform mode implementation module 200 of the encoder 100 may still use intra prediction 210 to select one of the eight aforementioned possibilities for intra prediction 221-228 shown in FIG. 2b by minimizing the error between the given predicted block 212 and the original current block 105.

However, when selecting the transform-based fallback mode, the encoder 100 may instead signal all zero transform coefficients 355 as the encoded quantized transform coefficients (e.g., instead of the encoded quantized transform coefficients 255 of FIG. 2a) to the decoder 400. That is, the residue is not calculated (e.g., residue calculation 220 of FIG. 2 is omitted) and the residue 335 is therefore assumed to be zero (for all components). The "all zero" residue 335 is then entropy coded by the entropy coder 250, and signaled to the decoder 400.

With respect to mode signaling, and unlike conventional encoders, if the encoder 100 picks the transform-based fallback mode for the current block 105, then the encoder 100 will signal the regular transform mode as the selected mode in the mode header instead of signaling as a transform-based fallback mode.

As will be discussed below, the concept of signaling a regular mode 110 when the corresponding fallback mode 120 is actually selected may be extended to BP-skip and MPPF modes. This may generally be achieved by the encoder 100 setting all residue to zero instead of performing the residue calculation 220 generally performed with regular modes 110.

Figure 4:
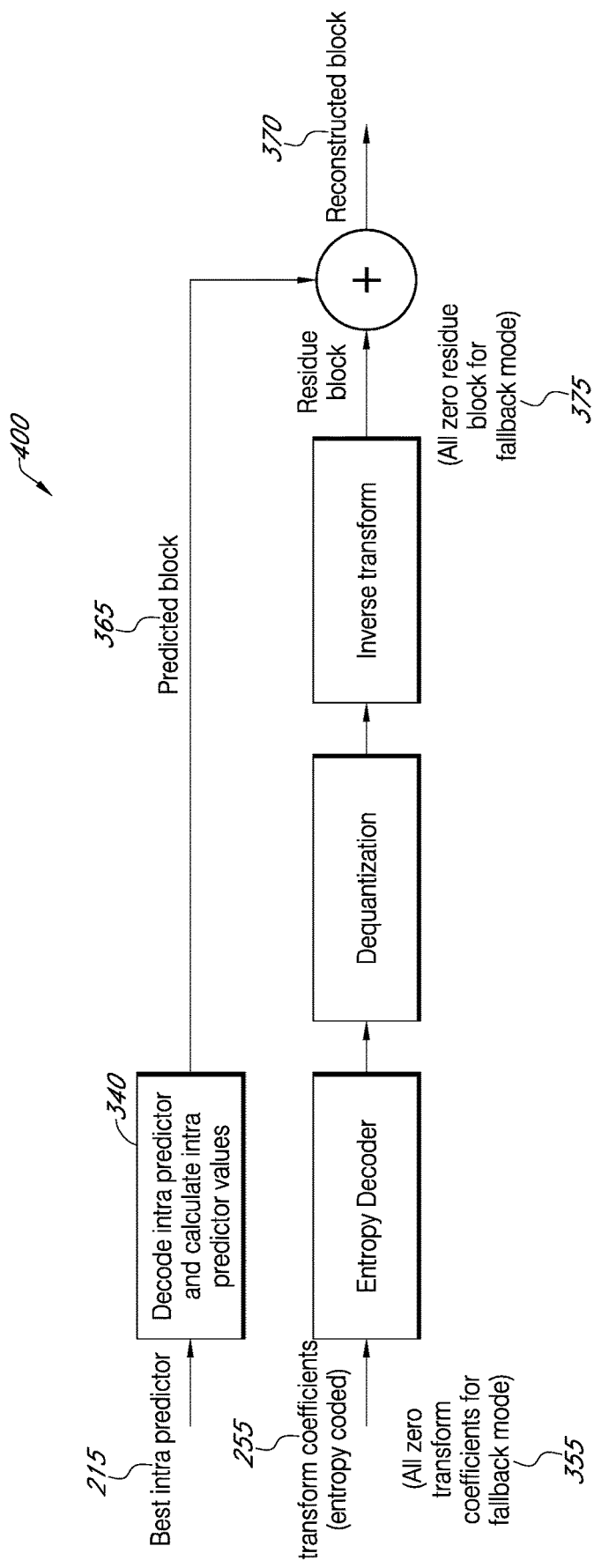
FIG. 4 is a block diagram illustrating a system and method for implementing a regular transform mode and a transform-based fallback mode at a decoder, according to an embodiment of the present disclosure.

FIG. 4 is a block diagram illustrating a system and method for implementing a regular transform mode and a transform-based fallback mode at a decoder, according to an embodiment of the present disclosure.

Referring to FIG. 4, as discussed above, the signaling syntax of both the regular transform mode and transform-based fallback mode may be the same (e.g., the mode header may be signaled the same as if the regular transform-based mode were selected). Therefore, at the decoder 400, there is no need to have a separate decoding process for the two different modes. Accordingly, the decoder 400 does not need any additional information whether it is decoding according to the transform mode or according to the transform-based fallback mode. That is, the transform-based fallback mode may use the same syntax as the transform mode, where the quantized residues 335 for all components are set to zero (e.g., all of the quantized residuals/quantized coefficients 355 are zero).

Due to component skip in the entropy encoder, all zero coefficients in a component are coded effectively. Component skip enables efficient signaling when all of the quantized coefficients 355 are found to zero. When all of the quantized coefficients 355 are found to be zero, a single bit may be signaled to thereby indicate that all of the coefficients 355 are zero, (e.g., a "1" may be signaled). When the quantized coefficients are not all zero, a single bit may be signaled to indicate such (e.g., a "0" may be signaled), followed by signaling the quantized coefficients. Accordingly, the reconstructed value/reconstructed block 370 of the current block 105 may correspond to the selected best intra predictor 215. That is, when the transform-based fallback mode is selected, the decoder 400 reconstructs the current block 105 to create a reconstructed block 370 using the best intra predictor 215, as all the residue samples 335 are zero.

After decoding, dequantizing, and performing an inverse transform on the all zero transform coefficients 355, an all zero residue block 375 is used with a predicted block 365 to create the reconstructed block 370. The predicted block 365 may be determined by the decoder 400 by decoding the signaled best predictor index 215, and by calculating the intra predictor values 340.

In another embodiment, and for example, only the transform mode is enabled while all other regular modes (i.e., the BP mode and the MPP mode) are disabled. In such a scenario, both the MPPF mode and the BP-skip mode may also be disabled. Accordingly, the transform-based fallback mode may be enabled, as at least one fallback mode is required to ensure proper behavior of the display stream codec.

By including a transform-based fallback mode over the MPPF or BP-skip modes, there may be no need to signal the type of mode (transform or transform-based fallback) per block to the decoder 400. Accordingly, there may also be a 1-bit saving per block, with better rate-distortion performance, and a reduced chance of selecting the fallback mode option at the encoder 100.

Furthermore, it should be noted that the decoder 400 of the present embodiment may operate in a consistent manner regardless of whether the encoder 100 is operating in a regular mode or a respective fallback mode. That is, although a conventional decoder may process information differently depending on a mode selected by the encoder, because the encoder 100 of the present embodiment does not signal when it switches from a regular mode to a fallback mode, or vice versa, the decoder 400 of the present embodiment does not distinguish between a regular mode and a respective fallback mode, and therefore treats the information received from the encoder 100 in a consistent manner among respective mode types, thereby simplifying operation of the codec, and improving display compression technology.

Figure 5:
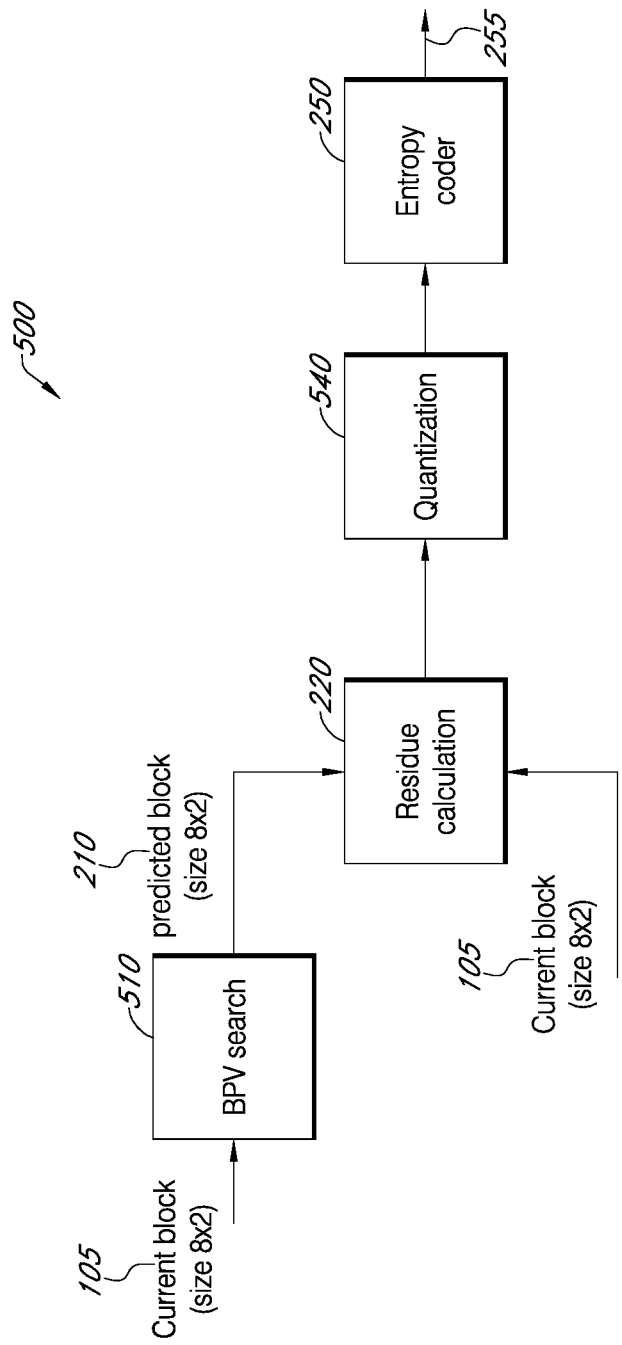
FIG. 5 is a block diagram illustrating a system and method for implementing a block prediction mode at an encoder, according to an embodiment of the present disclosure.

FIG. 5 is a block diagram illustrating a system and method for implementing a block prediction mode at an encoder, according to an embodiment of the present disclosure.

Referring to FIG. 5, according to other embodiments, the encoder 100 may also operate according to a BP mode. However, it should be noted that, because the encoder will not apply a transform on the calculated residue in the BP mode, the DCT transform 230 of FIG. 2*a* is omitted. Further, intra prediction 210 may also be omitted, and a BP search function 510 may be used instead. Additionally, instead of signaling a best predictor index 215, the encoder may signal BP vectors for the BP mode. The encoder 100 may select the BP mode for repeating patterns and graphics. At high quantizer parameter (QP), a significant portion of BP mode's rate may be allocated to block prediction vectors.

In the BP mode, a BP mode implementation module 500 of the encoder 100 generally seeks to make a match for a current block 105 from the current line or from the previous line. That is, the current block 105 may be spatially predicted from a set of reconstructed neighboring samples within a BP search range.

To improve performance, the current 8×2 block of pixels is partitioned into a set of four 2×2 sub-blocks. Each sub-block is predicted 210 from the BP search range using either a 2×2 partition or a pair of 2×1 partitions.

Accordingly, a block prediction vector (BPV) can be sent for an entirety of a 2×2 sub-block, or the 2×2 sub-block may be further partitioned into two 2×1 sub-blocks, wherein two BPV's are signaled (e.g., one BPV per 2×1 sub-blocks). That is, the 2×2 sub-block may be represented by a single block prediction vector (BPV) that will generate a 2×2 predicted block from the search range. Contrastingly, if a pair of 2×1 partitions is selected, the sub-block will be represented by two different BPVs. The first BPV will generate a 2×1 predicted block for the upper two samples in the sub-block, while the second BPV will generate a 2×1 predicted block for the lower two samples.

The encoder 100 may perform a BPV search 510 to find the BPV that minimizes distortion for each 2×2 and 2×1 partition within the current block 105. The result of this step is a set of BPV and a predicted block 210 for both partition types.

Next, the residual is computed 220. Thereafter, forward quantization may be performed on the residual samples using the quantization module 540, which may be different from the quantization module 240 of FIG. 2 due to differences in bit precision for the different respective modes. That is, the residue is quantized using the quantization module 540, and then entropy coded by the entropy coder 250 to generate encoded quantized coefficients 255.

The BP mode signaling syntax may be the same as the transform mode signaling syntax described above with the exception that, instead of indicating the intra prediction mode, the BP mode signaling syntax may indicate BP vectors (BPV), which may include 1-bit signaling for the partition type 1×2 or 2×2 and BPV for each partition.

Figure 6:
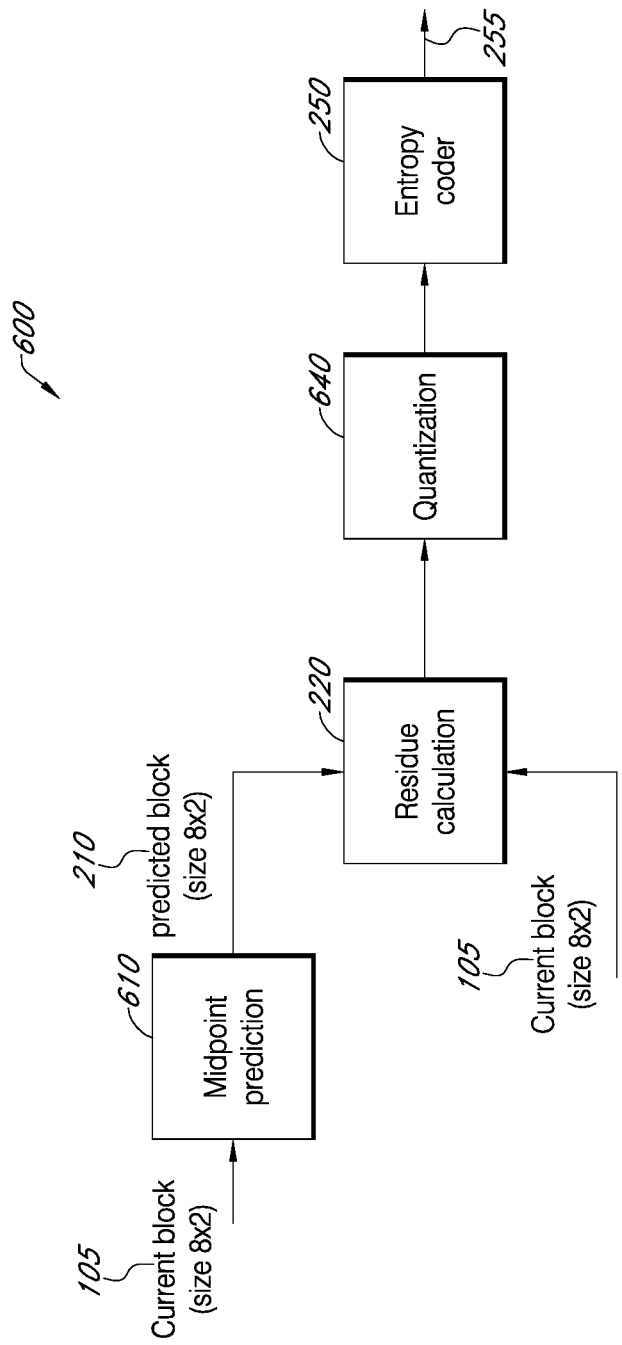
FIG. 6 is a block diagram illustrating a system and method for implementing a midpoint prediction mode at an encoder, according to an embodiment of the present disclosure.

FIG. 6 is a block diagram illustrating a system and method for implementing a midpoint prediction mode at an encoder, according to an embodiment of the present disclosure.

Referring to FIG. 6, according to another embodiment, the encoder 100 may also operate according to an MPP mode. As compared to the transform mode, and as with the BP mode, the DCT transform 230 is omitted. The encoder 100 may generally select the MPP mode for blocks that are completely uncorrelated, as may occur with random noise.

According to the MPP mode, an MPP mode implementation module 600 of the encoder 100 may perform a midpoint prediction 610 to generate a predicted block 210. Each sample in the current block 105 may be predicted from a single value known as a "midpoint predictor." The midpoint predictor may be calculated as the average of the spatially neighboring sample/spatially neighboring pixels. The residual block determined from the residue calculation 220 is treated differently than the residual blocks in the transform mode and the BP mode.

Further, rather than using a fractional quantizer for the quantization module 240, the MPP mode uses a scalar quantizer for the quantization module 640. The encoder 100 may then directly code 250 quantized residual samples using a fixed step-size for each sample, which is derived from the QP. The step size is signaled explicitly in the MPP mode signaling syntax such that the decoder 400 need not have updated QP information to decode the MPP residuals, thereby relaxing timing.

Accordingly, the MPP mode signaling syntax may generally be the same as both the BP mode signaling syntax and the transform mode signaling syntax described above, but instead of indicating the intra prediction mode or the BP vectors (BPV), the MPP mode syntax may indicate a colorspace (e.g., using a single bit), and may explicitly signal a quantizer step size (e.g., using three bits). Also, and for example, for a RGB 4:4:4 source, the prediction can be carried out either in native space (RGB) or in YCoCg space. Accordingly, an additional bit may be signaled to indicate which color space is used for prediction. It should be noted that the disclosed embodiments can be applied to all chroma formats (e.g., 444, 422, 420).

As described above, the encoder 100 may also operate according to the disclosed fall back modes 120. The concept of signaling a regular mode 110 when the corresponding fallback mode 120 is actually selected may be extended from the transform-based fallback mode to the BP-skip and MPPF modes. This may generally be achieved by the encoder 100 setting all residue to zero in its residue calculation 220.

According to the BP-skip mode, and referring to FIG. 4, when the BP-skip mode is selected, the reconstructed block 370 may be equal to the predicted block 365. The BP-skip mode may determine the reconstructed block 370 by using the block samples pointed by block prediction vectors by setting the residue block 375 to zero, where the residue (all values are zero) is explicitly signaled to the decoder 400. That is, the BP-skip mode reconstructs the current block 105 to generate the reconstructed block 370 using the predicted samples 365 (predicted samples correspond to the block samples pointed by the block prediction vector), as all the residue samples 375 are zero.

Accordingly, even when the encoder 100 selects the BP-Skip mode for the current block 105, the regular BP mode may still be indicated in the mode header. The same signaling syntax may be used as the regular BP mode, where the quantized residue for all components are set to zero (for all the components) and are signaled to the decoder 400, in addition to signaling the BPV. Due to the component skip, all zero coefficients in a component are coded effectively.

According to the MPP Fallback mode, if the encoder picks MPPF for the current block 105, then the regular MPP mode may be indicated in the mode header. Also, the same signaling syntax may be utilized as the MPP mode, where the step size is explicitly signaled. Accordingly, in the MPP fallback mode, the mode header may be signaled as the same as if the regular MPP mode were selected. Further, because the MPP mode signals the step size, in the MPP fallback mode of the present embodiment, the signaled step size may or may not be fixed, such that the required bits are fewer than the average block rate.

As discussed above, signaling a fallback mode conventionally requires signaling that a separate mode is used in the header, which may be a costly solution at higher compression ratios, or equivalently at lower bpp. When all modes are not needed for a piece of image content, the required signaling of the fallback modes might be too expensive. This fails to adequately provide flexibility in the design, and deleting an existing fallback mode, or adding a new fallback mode, would require the mode signaling table to be redesigned.

The embodiments describe below, however, provide an adequate solution to the problem above by providing the following contributions. First, the disclosed embodiments align the syntax of the fallback modes 120 to the syntax of their respective regular modes 110. The main difference is that for fallback modes the residue for all the color components are set to zero and are explicitly signaled to the decoder using the same entropy coding methods used in the respective regular mode. Second, there is also provided a new transform-based fallback mode, which uses the same signaling syntax same as of the regular transform mode.

Accordingly, because the signaling syntax of the regular mode and respective fallback modes are the same the decoder 400 does not distinguish between these two. Therefore, mode signaling involves only three modes—transform, BP and MPP modes. This may lead to bit savings by further limiting mode signaling.

Additionally, there may be a more flexible design, because the encoder and decoder can omit or add one or more fallback modes while keeping the same mode signaling. For example, the novel transform-based fallback described herein can be added to the codec as a sixth mode without further complicating the mode signaling of five modes (BP, MPP, transform mode, BP-skip, and MPP fallback mode).

Furthermore, because the disclosed embodiments enable the encoder 100 to signal only one of three modes, truncated binary code can be used. That is, one of the modes (BP mode, MPP mode, or transform mode) can be signaled using 1-bit, and the remaining two modes can be signaled using 2 bits.

Additionally, there may be bit savings compared to the mode signaling in the VDC-M (at least 2-bits required). The likelihood of fallback mode may be reduced (as one of the regular modes can be using 1-bit).

In other embodiments, when only one regular and one respective fallback mode are enabled, some example embodiments may remove the mode signaling. When the regular mode signaling syntax changes the respective fallback mode signaling syntax is modified as well in order to align the syntax.

Additionally, because of the flexible design enabled by example embodiments, there may be enhanced freedom to add new fallback modes, or even replace conventional fallback modes. There may also be signaling cost savings due to reduced mode signaling bits, which may translate into improved compression performance. Additionally, the decoding process is unified.

Accordingly, the disclosed embodiments provide improvements to the field of display technology by improving methods of display compression.

In the description, for the purposes of explanation, numerous specific details provide a thorough understanding of various embodiments. It is apparent, however, that various embodiments may be practiced without these specific details or with one or more equivalent arrangements. In other instances, well-known structures and devices are shown in block diagram form in order to avoid unnecessarily obscuring various embodiments.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises," "comprising," "have," "having," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

When a certain embodiment may be implemented differently, a specific process order may be performed differently from the described order. For example, two consecutively described processes may be performed substantially at the same time or performed in an order opposite to the described order.

The electronic or electric devices and/or any other relevant devices or components according to embodiments of the present disclosure described herein may be implemented utilizing any suitable hardware, firmware (e.g., an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the embodiments of the present disclosure.

Unless otherwise defined, all terms (including technical and scientific terms) used herein have the same meaning as commonly understood by one of ordinary skill in the art to which the present inventive concept belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise for example indicated. Accordingly, it will be understood by those of skill in the art that various changes in form and details may be made without departing from the spirit and scope of the present disclosure as set forth in the following claims, with functional equivalents thereof to be included therein.

What is claimed is:

1. A display stream codec for a display device comprising an encoder, wherein the encoder is configured to:
   determine a fallback display mode as a display mode for a current block to be encoded;
   represent a mode signaling of the fallback display mode that is identical to a mode signaling of a regular display mode corresponding to the fallback display mode;
   encode the current block in accordance with the fallback display mode using a same signaling syntax as the corresponding regular display mode; and
   send the encoded current block.

2. The display stream codec of claim 1, wherein the regular display mode is a transform display mode, and wherein the encoder is further configured to:
   select an intra predictor for the current block;
   send a predictor index corresponding to the intra predictor;
   generate a predicted block based on the selected intra predictor;
   calculate a residue between the current block and the predicted block;
   apply a transform on the residue to generate transform coefficients;
   quantize the transform coefficients to generate quantized transform coefficients;
   entropy encode the quantized transform coefficients to generate encoded quantized transform coefficients; and
   send the encoded quantized transform coefficients.

3. The display stream codec of claim 1, wherein the fallback display mode is a transform-based fallback display mode,
   wherein the encoder is further configured to:
      select an intra predictor for the current block;
      send a predictor index corresponding to the intra predictor;
      set a residue corresponding to the current block as zero;
      set quantized transform coefficients same as residue; and
      entropy encode the quantized transform coefficients.

4. The display stream codec of claim 2, wherein the display stream codec further comprises a decoder in communication with the encoder, wherein the decoder is configured to:
   receive an encoded block of data comprising mode signaling bits;
   receive mode-specific information;
   receive a quantized residue; and
   process the received mode signaling bits, the received mode-specific information, and the received quantized residue to decode the encoded block of data.

5. The display stream codec of claim 4, wherein the decoder is further configured to:
   receive the predictor index from the encoder;
   decode the intra predictor;
   calculate intra predictor values;
   generate a predicted block based on the intra predictor values;
   receive the transform coefficients from the encoder;
   generate a residue block based on the transform coefficients; and
   generate a reconstructed block by summing the predicted block and the residue block.

6. The display stream codec of claim 4, wherein the mode-specific information comprises at least one of:
   an intra predictor index when the regular display mode comprises a transform display mode and the fallback display mode is a transform-based fallback display mode;
   a block prediction vector when the regular display mode comprises a block prediction display mode and the fallback display mode comprises a BP-skip mode; and
   a step size and a color space when the regular display mode comprises a midpoint prediction display mode and the fallback display mode comprises a midpoint prediction fallback display mode.

7. The display stream codec of claim 4, wherein the decoder is further configured to operate in the same manner for both the regular display mode and the fallback display mode.

8. The display stream codec of claim 1, wherein the signaling syntax comprises at least one bit for indicating the regular display mode, mode-specific information, and a plurality of bits representing a quantized residue corresponding to the current block, wherein the quantized residue for the fallback display mode is set to zero.

9. A method for encoding display data, the method comprising:
   determining, by an encoder, a fallback display mode as a display mode for a current block to be encoded;
   representing, by the encoder, a mode signaling of the fallback display mode that is identical to a mode signaling of a regular display mode corresponding to the fallback display mode;
   encoding, by the encoder, the current block in accordance with the fallback display mode using a same signaling syntax as the corresponding regular display mode; and
   sending, by the encoder, the encoded current block.

10. The method of claim 9, wherein the regular display mode is a transform display mode, the method further comprising:
   selecting, by the encoder, an intra predictor for the current block;
   sending, by the encoder, a predictor index corresponding to the intra predictor;
   generating, by the encoder, a predicted block based on the selected intra predictor;
   calculating, by the encoder, a residue between the current block and the predicted block;
   applying, by the encoder, a transform on the residue to generate transform coefficients;

quantizing, by the encoder, the transform coefficients to generate quantized transform coefficients;

entropy encoding, by the encoder, the quantized transform coefficients to generate encoded quantized transform coefficients; and sending, by the encoder, the encoded quantized transform coefficients, wherein the residue is calculated as zero when the fallback display mode is selected.

11. The method of claim 9, wherein the fallback display mode is a transform-based fallback display mode, the method further comprising:

selecting, by the encoder, an intra predictor for the current block;

sending, by the encoder, a predictor index corresponding to the intra predictor;

setting, by the encoder, a residue corresponding to the current block as zero;

setting, by the encoder, quantized transform coefficients same as residue; and entropy encoding, by the encoder, the quantized transform coefficients.

12. The method of claim 10, further comprising:

receiving, by a decoder in communication with the encoder, an encoded block of data comprising mode signaling bits;

receiving, by the decoder, mode-specific information;

receiving, by the decoder, a quantized residue; and processing, by the decoder, the received mode signaling bits, the received mode-specific information, and the received quantized residue to decode the encoded block of data.

13. The method of claim 12, further comprising:

receiving, by the decoder, the predictor index from the encoder;

decoding, by the decoder, the intra predictor;

calculating, by the decoder, intra predictor values;

generating, by the decoder, a predicted block based on the intra predictor values;

receiving, by the decoder, transform coefficients from the encoder;

generating, by the decoder, a residue block based on the transform coefficients; and generating, by the decoder, a reconstructed block by summing the predicted block and the residue block.

14. The method of claim 12, wherein the mode-specific information comprises at least one of:

an intra predictor index when the regular display mode comprises a transform display mode and the fallback display mode is a transform-based fallback display mode;

a block prediction vector when the regular display mode comprises a block prediction display mode and the fallback display mode comprises a BP-skip mode; and a step size and a color space when the regular display mode comprises a midpoint prediction display mode and the fallback display mode comprises a midpoint prediction fallback display mode.

15. The method of claim 14, further comprising operating, by the decoder, in the same manner for both the regular display mode and the fallback display mode.

16. The method of claim 9, wherein the signaling syntax comprises at least one bit for indicating the regular display mode, mode-specific information, and a plurality of bits representing a quantized residue corresponding to the current block, wherein the quantized residue for the fallback display mode is set to zero.

17. A non-transitory computer readable medium implemented on a display codec for a display device, the non-transitory computer readable medium having computer code that, when executed on a processor, implements a method of display compression, the method comprising:

determining, by an encoder, a fallback display mode as a display mode for a current block to be encoded;

representing, by the encoder, a mode signaling of the fallback display mode that is identical to a mode signaling of a regular display mode corresponding to the fallback display mode;

encoding, by the encoder, the current block in accordance with the fallback display mode using a same signaling syntax as the corresponding regular display mode; and sending, by the encoder, the encoded current block.

18. The non-transitory computer readable medium of claim 17, wherein the fallback display mode is a transform-based fallback display mode, wherein the computer code, when executed by the processor, further implements the method of display compression by:

selecting, by the encoder, an intra predictor for the current block;

sending, by the encoder, a predictor index corresponding to the intra predictor;

setting, by the encoder, a residue corresponding to the current block as zero;

setting, by the encoder, quantized transform coefficients same as residue; and entropy encoding, by the encoder, the quantized transform coefficients.

19. The non-transitory computer readable medium of claim 17, wherein the computer code, when executed by the processor, further implements the method of display compression by:

receiving, by a decoder in communication with the encoder, an encoded block of data comprising mode signaling bits;

receiving, by the decoder, mode-specific information;

receiving, by the decoder, a quantized residue; and processing, by the decoder, the received mode signaling bits, the received mode-specific information, and the received quantized residue to decode the encoded block of data.

* * * * *